US012271124B2

(12) United States Patent
Imanaka

(10) Patent No.: US 12,271,124 B2
(45) Date of Patent: Apr. 8, 2025

(54) DEVELOPMENT DEVICE HAVING A DEVELOPING CONTAINER WITH A VENT HOLE AND IMAGE FORMING APPARATUS PROVIDED THEREWITH

(71) Applicant: KYOCERA Document Solutions Inc., Osaka (JP)

(72) Inventor: Koichi Imanaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/429,829

(22) Filed: Feb. 1, 2024

(65) Prior Publication Data

US 2024/0264553 A1 Aug. 8, 2024

(30) Foreign Application Priority Data

Feb. 3, 2023 (JP) ................................ 2023-015258

(51) Int. Cl.
*G03G 15/08* (2006.01)
*G03G 21/20* (2006.01)

(52) U.S. Cl.
CPC ..... *G03G 15/0891* (2013.01); *G03G 15/0875* (2013.01); *G03G 15/0889* (2013.01);
(Continued)

(58) Field of Classification Search
CPC ........... G03G 15/0891; G03G 15/0875; G03G 15/0889; G03G 2215/068; G03G 15/0893;
(Continued)

(56) References Cited

U.S. PATENT DOCUMENTS 4,583,112 A * 4/1986 Morano ............. G03G 15/0898 399/103
4,800,411 A * 1/1989 Tanaka .................... G06T 9/005 399/267

(Continued)

FOREIGN PATENT DOCUMENTS

JP 2018-081301 A 5/2018
JP 2018-197835 A 12/2018
JP 2019-211623 A 12/2019

*Primary Examiner* — Stephanie E Bloss
*Assistant Examiner* — Laura Roth
(74) *Attorney, Agent, or Firm* — Stein IP, LLC

(57) ABSTRACT

A development device includes a development container, a stirring conveyance member, a developer carrier, a vent hole, a filter, and a developer leakage prevention sheet. The stirring conveyance member conveys, while stirring, the developer containing toner inside the development container. The developer carrier carries on its outer circumferential surface the developer to feed the toner to an image carrier on which an electrostatic latent image is formed. The vent hole is formed in the development container to allow the inside and outside of the development container to communicate with each other. The filter is arranged to cover the vent hole from outside the development container. The developer leakage prevention sheet is flexible and is arranged inside the development container, opposite the vent hole so as to overlap the entire vent hole. A gap is formed between the developer leakage prevention sheet and the opening edge of the vent hole.

7 Claims, 6 Drawing Sheets

(52) U.S. Cl.
CPC ....... *G03G 15/0898* (2013.01); *G03G 21/206* (2013.01); *G03G 15/0893* (2013.01); *G03G 2215/068* (2013.01); *G03G 2221/1645* (2013.01)

(58) Field of Classification Search
CPC ............. G03G 15/0898; G03G 21/206; G03G 15/0896; G03G 2221/1645; G03G 2221/1648
See application file for complete search history.

(56) References Cited

U.S. PATENT DOCUMENTS

| | | | | |
|---|---|---|---|---|
| 5,758,231 | A * | 5/1998 | Coffey | G03G 15/0855 222/189.09 |
| 5,887,227 | A * | 3/1999 | Kawai | G03G 15/0126 399/119 |
| 2009/0074466 | A1* | 3/2009 | Kwon | G03G 15/0855 399/252 |
| 2011/0008068 | A1* | 1/2011 | Kunihiro | G03G 15/0898 399/92 |
| 2014/0376951 | A1* | 12/2014 | Ogawa | G03G 15/0898 399/98 |
| 2017/0336734 | A1* | 11/2017 | Nagashima | G03G 15/09 |
| 2018/0129150 | A1 | 5/2018 | Taniguchi et al. | G03G 15/0891 |
| 2020/0183325 | A1* | 6/2020 | Park | G03G 15/0808 |
| 2021/0294244 | A1* | 9/2021 | Oikawa | G03G 15/0942 |
| 2024/0302790 | A1* | 9/2024 | Otsuka | G03G 15/0865 |

* cited by examiner

DEVELOPMENT DEVICE HAVING A DEVELOPING CONTAINER WITH A VENT HOLE AND IMAGE FORMING APPARATUS PROVIDED THEREWITH

INCORPORATION BY REFERENCE

This application is based on and claims the benefit of priority from Japanese Patent Application No. 2023-015258 filed on Feb. 3, 2023, the contents of which are hereby incorporated by reference.

BACKGROUND

The present disclosure relates to development devices incorporated in image forming apparatuses that include image carriers, such as copiers, printers, facsimile machines, and multifunctional machines having their functions integrated together, and image forming apparatuses provided with the development device.

Image forming apparatuses employing an electrophotographic method, such as printers and copiers include a photosensitive drum that carries an electrostatic latent image and a development device that feeds toner to the photosensitive drum to develop the electrostatic latent image into a toner image. In such a development device, as a development roller (developer carrier) rotates and air flows into the development device, the internal pressure in the development device may increase. An increase in the internal pressure in the development device increases the amount of scattering toner and hinders the conveyance of supplied toner, so it is necessary to depressurize the development device.

In order to prevent leakage of toner while reducing the pressure inside the development device, a configuration is known in which a development container is provided with an opening for venting air (depressurizing) and a filter member.

SUMMARY

According to one aspect of the present disclosure, a development device includes a development container, a stirring conveyance member, a developer carrier, a vent hole, a filter, and a developer leakage prevention sheet. The development container stores developer containing toner. The stirring conveyance member conveys, while stirring, the developer inside the development container. The developer carrier is rotatably supported inside the development container and it carries on its outer circumferential surface the developer to feed the toner to an image carrier on which an electrostatic latent image is formed. The vent hole is formed in the development container and, through the opening, the inside and outside of the development container communicate with each other. The filter is arranged to cover the vent hole from outside the development container. The developer leakage prevention sheet is flexible and is arranged inside the development container, opposite the vent hole so as to overlap the entire vent hole. A gap is formed between the developer leakage prevention sheet and the opening edge of the vent hole.

DETAILED DESCRIPTION

Figure 1:
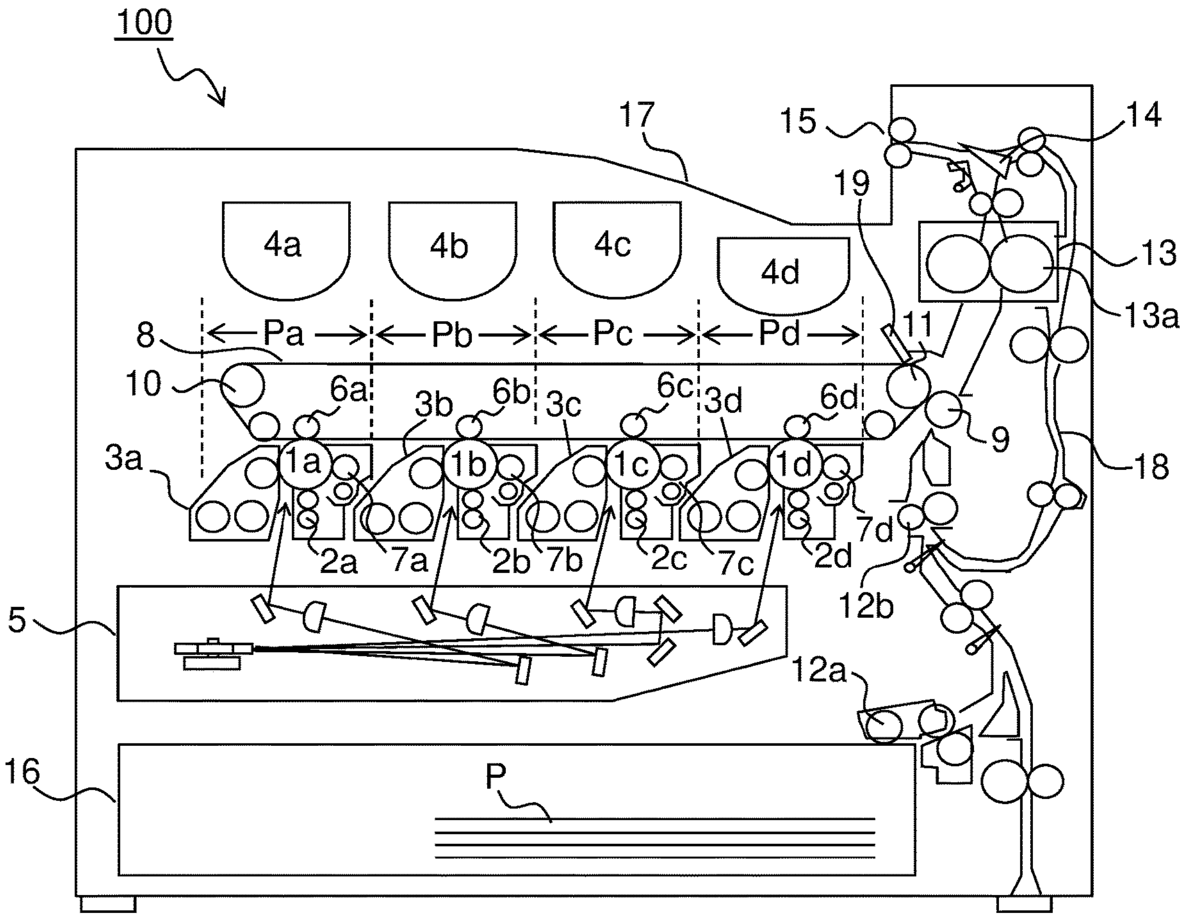
FIG. 1 is a schematic sectional view of an image forming apparatus incorporating development devices according to the present disclosure.

Hereinafter, an embodiment of the present disclosure will be described with reference to the drawings. FIG. 1 is a sectional view showing the inner construction of an image forming apparatus 100 including development devices 3*a* to 3*c* according to the present disclosure. Inside a main body of the image forming apparatus 100 (here, a color printer), four image forming portions Pa, Pb, Pc, and Pd are arranged in this order from upstream (the left side in FIG. 1) in the conveyance direction. These image forming portions Pa to Pd are provided to correspond to images of four different colors (yellow, cyan, magenta, and black) and sequentially form images of yellow, cyan, magenta, and black, each through the processes of electrostatic charging, exposure to light, image development, and image transfer.

In the image forming portions Pa to Pd, photosensitive drums (image carriers) 1*a*, 1*b*, 1*c*, and 1*d* that carry visible images (toner images) of the different colors are arranged respectively. An intermediate transfer belt (intermediate transfer body) 8 that rotates counterclockwise in FIG. 1 by being driven by a belt driving motor (not illustrated) is provided adjacent to the image forming portions Pa to Pd.

When image data is fed in from a host device such as a personal computer, first, a main motor (not illustrated) starts to drive the photosensitive drums 1*a* to 1*d* to rotate. Then, charging devices 2*a* to 2*d* electrostatically charge the surfaces of the photosensitive drums 1*a* to 1*d* uniformly. Next, an exposure device 5 irradiates the photosensitive drums 1*a* to 1*d* with light according to image data to form on them electrostatic latent images according to image data. The development devices 3*a* to 3*d* are loaded with predetermined amounts of two-component developer containing toner of different colors, namely yellow, cyan, magenta, and black respectively. When, as image formation proceeds as will be described later, the proportion of the toner in the two-component developer in the development devices 3*a* to 3*d* falls below a prescribed value, toner is supplied from toner containers 4*a* to 4*d* to the development devices 3*a* to 3*d*. The toner in the developer is fed from the development devices 3*a* to 3*d* to the photosensitive drums 1*a* to 1*d* and electrostatically adhere to them. Thus, toner images are formed according to the electrostatic latent images formed by exposure to light from the exposure device 5.

Then, primary transfer rollers 6*a* to 6*d* apply an electric field at a predetermined transfer voltage between the primary transfer rollers 6*a* to 6*d* and the photosensitive drums 1*a* to 1*d*, and thereby the toner images of yellow, cyan, magenta, and black on the photosensitive drums 1*a* to 1*d* are primarily transferred to the intermediate transfer belt 8. The toner and the like remaining on the surfaces of photosensitive drums 1*a* to 1*d* after primary transfer are removed by cleaning devices 7*a* to 7*d*.

A transfer sheet P on which the toner images are to be secondarily transferred is stored inside a sheet cassette 16 disposed in a bottom part in the main body of the image forming apparatus 100 and is conveyed via a sheet feed roller 12*a* and a pair of registration rollers 12*b* to a nip portion between the secondary transfer roller 9 and a driving roller 11 for the intermediate transfer belt 8. A blade-form belt cleaner 19 for removing the toner and the like remaining on the surface of the intermediate transfer belt 8 is disposed downstream of the secondary transfer roller 9.

The transfer sheet P conveyed to a fixing portion 13 is heated and pressed by a pair of fixing rollers 13*a*, so that the toner images are fixed to the surface of the transfer sheet P and a predetermined full-color image is formed. The transfer sheet P with the full-color image formed on it has its conveyance direction switched by a branch portion 14 that branches into a plurality of directions and is discharged as it is (or after being diverted to a duplex conveyance passage 18 to have images formed on both sides) to a discharge tray 17 by a pair of discharge rollers 15.

Figure 2:
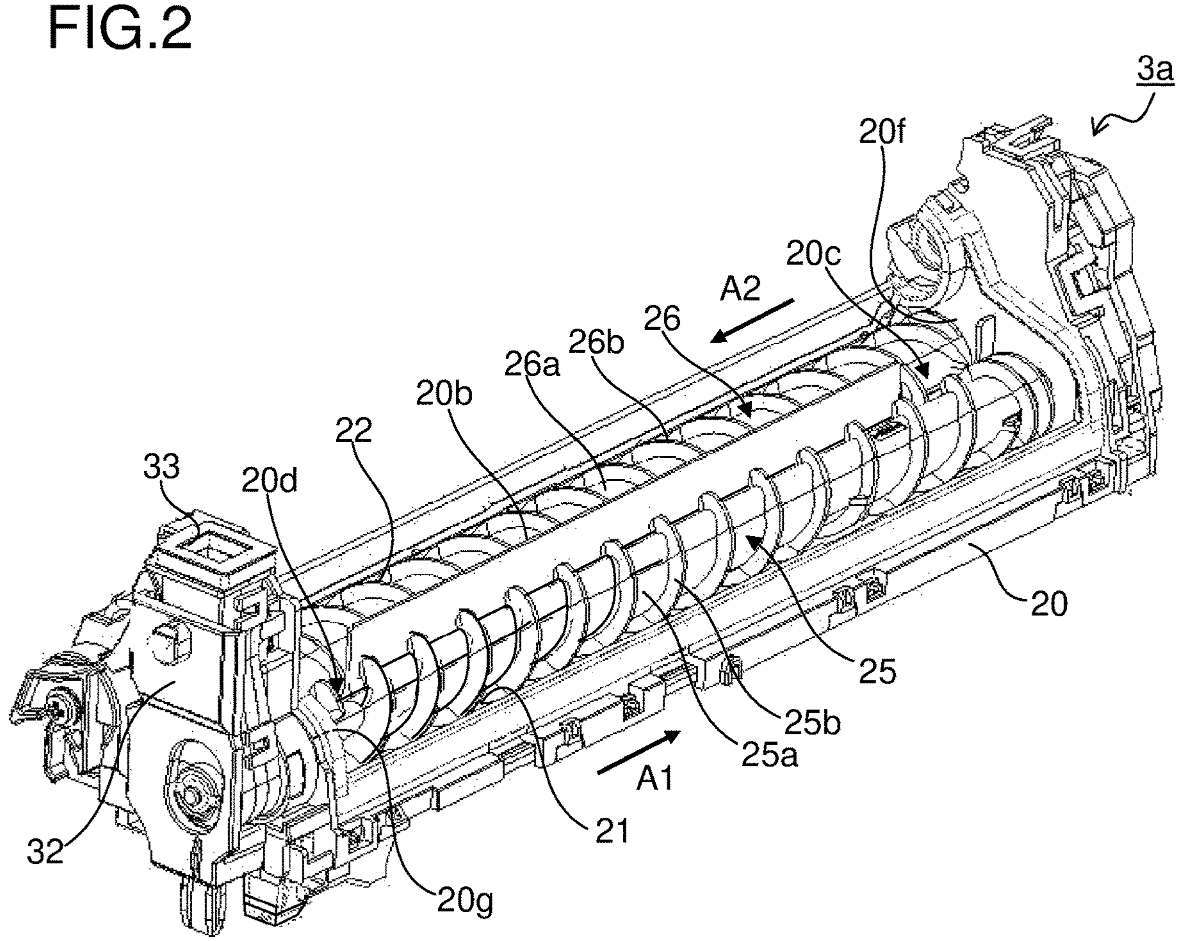
FIG. 2 is a perspective view of a development device according to a first embodiment of the present disclosure.
Figure 3:
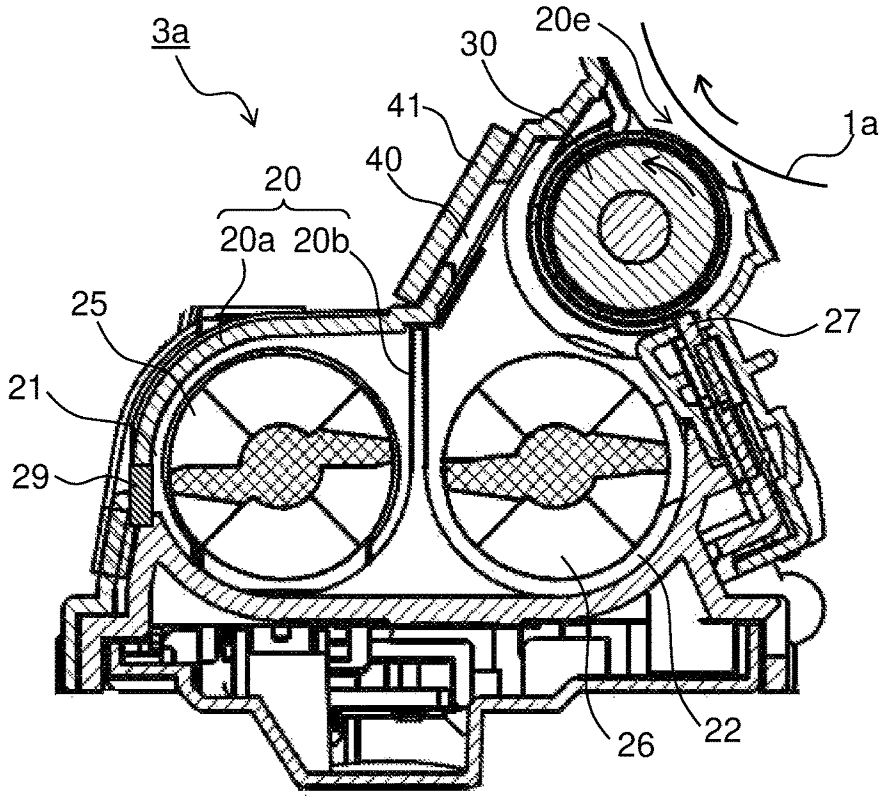
FIG. 3 is a side sectional view of the development device according to the first embodiment.

FIG. 2 is a perspective view of the development device 3*a* according to a first embodiment of the present disclosure that is incorporated in the image forming apparatus 100. FIG. 3 is a side sectional view of the development device 3*a* according to the first embodiment. FIG. 2 omits illustration of a cover member 20*a* of a development container 20 and a development roller 30 assuming that these are removed. The following description deals with, as an example, the development device 3*a* disposed in the image forming portion Pa shown in FIG. 1. Basically a similar description applies to the structure of the development devices 3*b* to 3*d* disposed in the image forming portions Pb to Pd and therefore their description will be omitted. The development devices 3*a* to 3*d* are removably mounted in the image forming apparatus 100.

As shown in FIGS. 2 and 3, the development device 3*a* includes a development container 20 that stores two-component developer (hereinafter, also referred to simply as developer) containing magnetic carrier and toner. The development container 20 includes a cover member 20*a*, a partition wall 20*b*, a first communication portion 20*c*, a second communication portion 20*d*, a stirring conveyance chamber 21, a feeding conveyance chamber 22, and a toner supplying portion 32.

The cover member 20*a* is removably fitted to the development container 20 main body and constitutes an upper part of the development container 20. The partition wall 20*b* divides the inside of the development container 20 into the stirring conveyance chamber 21 and the feeding conveyance chamber 22, which are disposed side by side. Through the first and second communication portions 20*c* and 20*d*, the stirring conveyance chamber 21 communicates with the feeding conveyance chamber 22 at in opposite end parts of the partition wall 20*b* in the longitudinal direction.

In the stirring and feeding conveyance chambers 21 and 22 are rotatably disposed a stirring conveyance screw 25 and a feeding conveyance screw 26, respectively, for mixing toner fed from the toner container 4*a* (see FIG. 1) with magnetic carrier and stirring and electrostatically charging the toner. In this embodiment, two-component developer containing positively chargeable toner and ferrite resin-coated carrier is used.

The stirring conveyance screw 25 has a rotation shaft 25*a* and a first conveyance blade 25*b* formed in a spiral shape at a constant pitch in the axial direction of the rotation shaft 25*a*. The rotation shaft 25*a* and the first conveyance blade 25*b* are integrally molded of synthetic resin. The first conveyance blade 25*b* extends to opposite end parts of the stirring conveyance chamber 21 in the longitudinal direction, up to positions facing the first and second communication portions 20*c* and 20*d*. The rotation shaft 25*a* is rotatably pivoted on a first side wall portion 20*f* and a second side wall portion 20*g* of the development container 20. The stirring conveyance screw 25 conveys, while stirring, the developer inside the stirring conveyance chamber 21 in one direction (arrow A1 direction).

The feeding conveyance screw 26 has a rotation shaft 26*a* and a second conveyance blade 26*b* formed in a spiral shape at a constant pitch in the axial direction of the rotation shaft 26*a*. The rotation shaft 26*a* and the second conveyance blade 26*b* are integrally molded from synthetic resin. The second conveyance blade 26*b* has a length equal to or larger than the axial length of the development roller 30 and extends up to positions facing the first and second communication portions 20*c* and 20*d*. The rotation shaft 26*a* is disposed parallel to the rotation shaft 25*a* and is rotatably pivoted the first side wall portion 20*f* and the second side wall portion 20*g* of the development container 20. The feeding conveyance screw 26 conveys, while stirring, the developer inside the feeding conveyance chamber 22 in the opposite direction (arrow A2 direction) to the stirring conveyance screw 25.

The developer is thus, while being stirred, conveyed in the axial direction (the direction perpendicular to the plane of FIG. 3) by the stirring and feeding conveyance screws 25 and 26 and circulates between the stirring and feeding conveyance chambers 21 and 22 via the first and second communication portions 20*c* and 20*d* formed in opposite end parts of the partition wall 20*b*. That is, the stirring conveyance chamber 21, the first communication portion 20*c*, the feeding conveyance chamber 22, and the second communication portion 20*d* constitute a circulation passage of the developer inside the development container 20.

The development container 20 extends obliquely to the upper right in FIG. 3, and inside the development container 20, the development roller 30 is disposed obliquely to the upper right of the feeding conveyance screw 26. Part of the outer circumferential surface of the development roller 30 is exposed through an opening 20*e* in the development container 20 and faces the photosensitive drum 1*a* at a predetermined interval (development gap). The development roller 30 rotates counterclockwise (trail-rotates at a position facing the photosensitive drum 1*a*) in FIG. 3.

Figure 4:
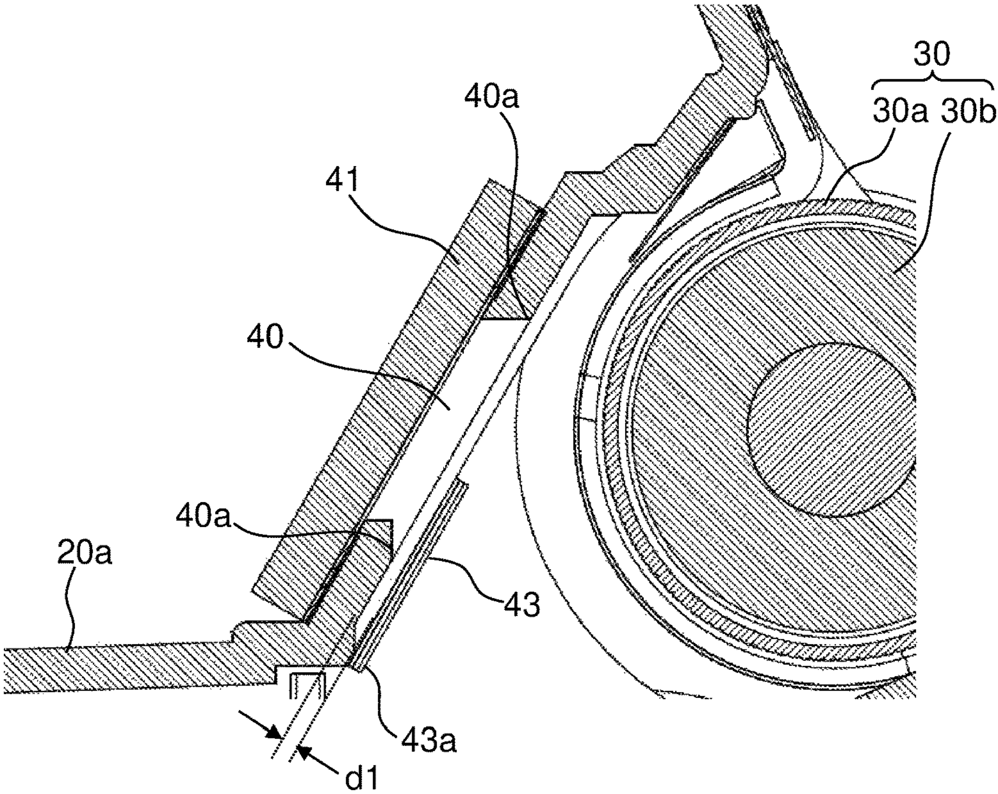
FIG. 4 is an enlarged view around the vent hole in FIG. 3.

The development roller 30 is composed of a development sleeve 30*a* in a cylindrical shape that rotates counterclockwise in FIG. 3, and a magnet 30*b* having a plurality of magnetic poles that is fixed inside the developing sleeve 30*a* (see FIG. 4 for both). Here, a development sleeve 30*a* with a knurled surface is used; instead it is also possible to use a development sleeve 30*a* with many depressions (dimples) formed on the surface; a developing sleeve 30*a* with a blasted surface; a developing sleeve 30*a* having undergone knurling and depression formation as well as blasting; a developing sleeve 30*a* plated for improved durability; a developing sleeve 30*a* having undergone alumite treatment; or a developing sleeve 30*a* having undergone alumite treatment followed by treatment of pores in alumite with a metal salt such as of Ni, Sn, and Mo, that is, one treated by what is called a secondary electrolytic coloring method. The development roller 30 is supplied with a development voltage containing a direct-current voltage and an alternating-current voltage from a development voltage power supply (not illustrated).

The development container 20 is fitted with a restriction blade 27 along the longitudinal direction of the development roller 30 (the direction perpendicular to the plane of FIG. 3). A small interval (gap) is formed between a tip portion of the restriction blade 27 and the development roller 30. In this embodiment, as the restriction blade 27, a magnetic blade made of stainless steel (SUS430) is used.

In a side face of the stirring conveyance chamber 21, a toner concentration sensor 29 is disposed opposite the stirring conveyance screw 25. The toner concentration sensor 29 senses the toner concentration in the developer (the mixing ratio of the toner to the carrier in the developer; T/C) in the development container 20. As the toner concentration sensor 29, for example, a magnetic permeability sensor that detects the magnetic permeability of the two-component developer containing toner and magnetic carrier in the developer container 20 is used. According to the toner concentration sensed by the toner concentration sensor 29, the toner in the toner container 4*a* (see FIG. 1) is supplied into the development container 20 via the toner supplying portion 32.

The toner supplying portion 32 is disposed upstream of the stirring conveyance chamber 21 with respect to the developer conveyance direction (arrow A1 direction). A toner supplying port 33 is open in a top part of the toner supplying portion 32 and is connected to a main body conveyance passage (not illustrated) that extends downward from the toner container 4*a* (see FIG. 1).

As described previously, as the development roller 30 rotates and air flows into the development devices 3*a* to 3*d*, the internal pressure in the development devices 3*a* to 3*d* may increase. An increase in the internal pressure in the development devices 3*a* to 3*d* increases the amount of scattering toner and hinders the conveyance of supplied toner, so it is necessary to depressurize the development device 3*a* to 3*d*.

To cope with that, in this embodiment, a vent hole 40 is formed in the cover member 20*a* of the development container 20 to let out the internal pressure in the development container 20. The vent hole 40 is an opening for communication between the inside and outside of the development container 20 and a pair of vent holes 40 are formed in opposite end parts of the development container 20 in the longitudinal direction (the direction perpendicular to the plane of FIG. 3).

Each vent hole 40 is provided with a filter 41. The filter 41 is arranged to cover the vent hole 40 from outside the development container 20. The filter 41 is formed to have a mesh size (approximately 1 to 3 μm) smaller than the toner particle diameter (approximately 4 to 5 μm) and the filter 41 lets pass through it hardly any toner floating in the development container 20. However, if developer is pressed against the filter 41 due to vibration or shock during transportation of the development device 3*a*, some toner may pass through the filter 41.

Figure 5:
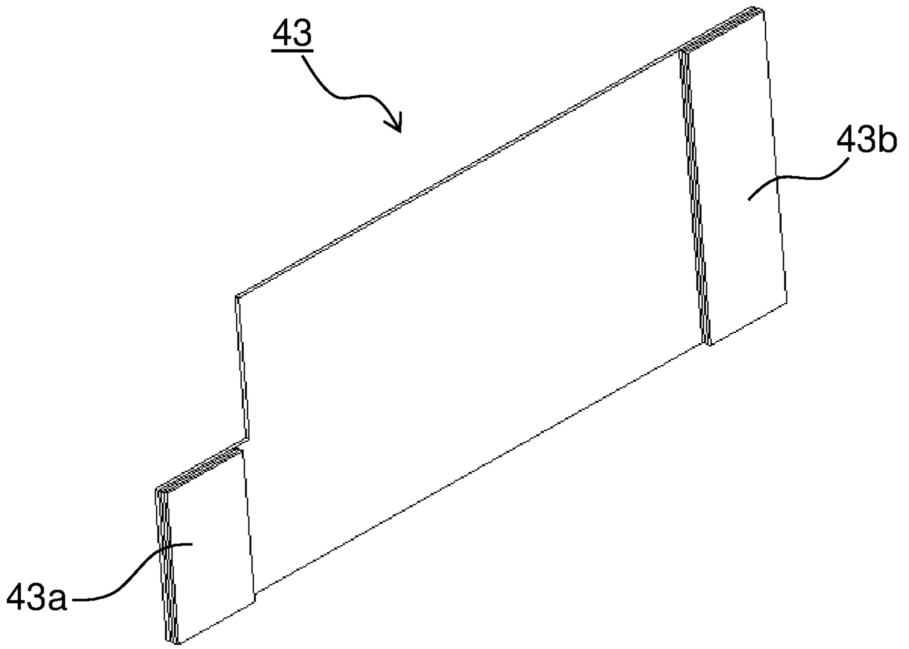
FIG. 5 is a perspective view of a developer leakage prevention sheet as viewed from outside the development container.

FIG. 4 is an enlarged view around the vent hole 40 in FIG. 3. Note that FIG. 4 shows a cross-section near a fixing portion 43*a* (see FIG. 5) of a developer leakage prevention sheet 43. As shown in FIGS. 4 and 5, the developer leakage prevention sheet 43 is arranged opposite the vent hole 40 inside the development container 20. The developer leakage prevention sheet 43 is larger than the vent hole 40 and is arranged so as to overlap the entire vent hole 40.

Figure 6:
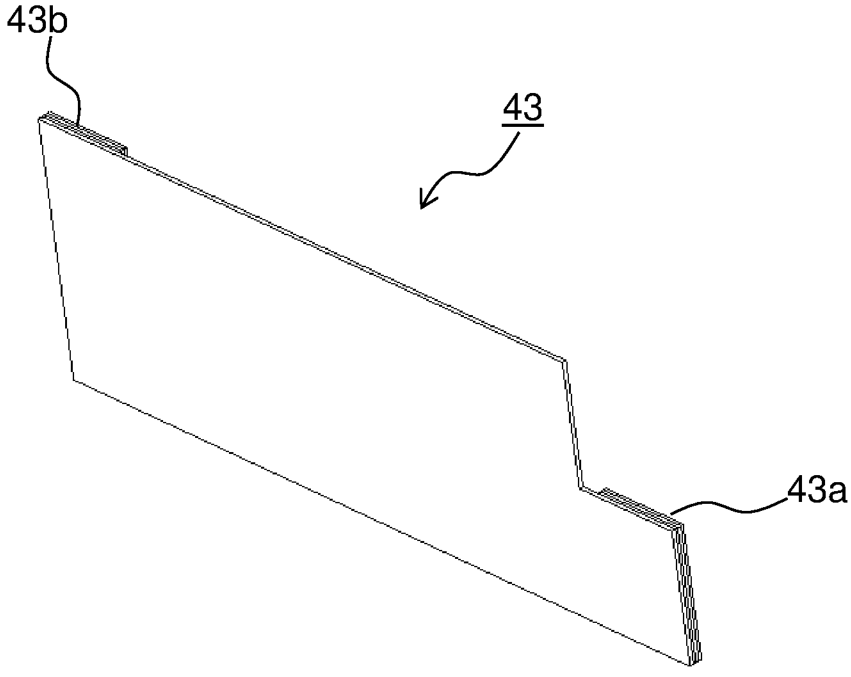
FIG. 6 is a perspective view of the developer leakage prevention sheet as viewed from inside the development container.

FIGS. 5 and 6 are perspective views of the developer leakage prevention sheet 43 as viewed from the outside (vent hole 40 side) and inside (development roller 30 side), respectively, of the development container 20. The developer leakage prevention sheet 43 has a substantially rectangular shape and has one of its four corners (upper left corner in FIG. 5, upper right corner in FIG. 6) cut out to fit the inner surface shape (projection) of the development container 20. The developer leakage prevention sheet 43 has fixing portions 43*a* and 43*b* formed by laying a plurality of sheets together along two sides in the left-right direction. Attaching the fixing portions 43*a* and 43*b* to the opening edge of the vent hole 40 leaves a gap d1 from the opening edge 40*a* of the vent hole 40 along two sides of the developer leakage prevention sheet 43 in the up-down direction.

With the gap d1 provided between the developer leakage prevention sheet 43 and the opening edge 40*a* of the vent hole 40, a ventilation passage from inside the development container 20 to the vent hole 40 is secured. Thus, it is possible to prevent an increase in the internal pressure when the development device 3*a* is driven. With the gap d1 formed along two sides of the developer leakage prevention sheet 43 in the up-down direction, if developer enters between the developer leakage prevention sheet 43 and the filter 41 due to vibration or shock during transportation of the development device 3*a*, the developer can be returned through the gap d1 at the lower end of the developer leakage prevention sheet 43 to the development container 20 (feeding conveyance chamber 22). While there is no particular restriction on the size of the gap d1, too large a gap d1 has a small effect of preventing leakage of developer. Thus, it is preferable that the gap d1 be 2 mm or less.

There is no particular limitation to the developer leakage prevention sheet 43 as long as it is a layer made of synthetic resin. However, if the developer leakage prevention sheet 43 is made of a material that is too flexible, the developer leakage prevention sheet 43 may be pressed against the vent hole 40 under an increased internal pressure in the development container 20 in such a way as to block the vent hole 40. Thus, the developer leakage prevention sheet 43 is preferably made of a material that is little flexible (stiff). In this embodiment, a sheet made of polyethylene terephthalate (PET) is used.

With the construction according to this embodiment, the developer leakage prevention sheet 43 is arranged inward of the vent hole 40 with a gap d1 from it in the up-down direction. In this way, it is possible to secure a ventilation passage from inside the developer container 20 to the vent hole 40, and also to suppress leakage of even a very small amount of developer from the filter 41 during transportation. Owing to a simple configuration that just requires arranging the developer leakage prevention sheet 43, it is also possible to prevent an increase in the cost of the development device 3*a*.

Figure 7:
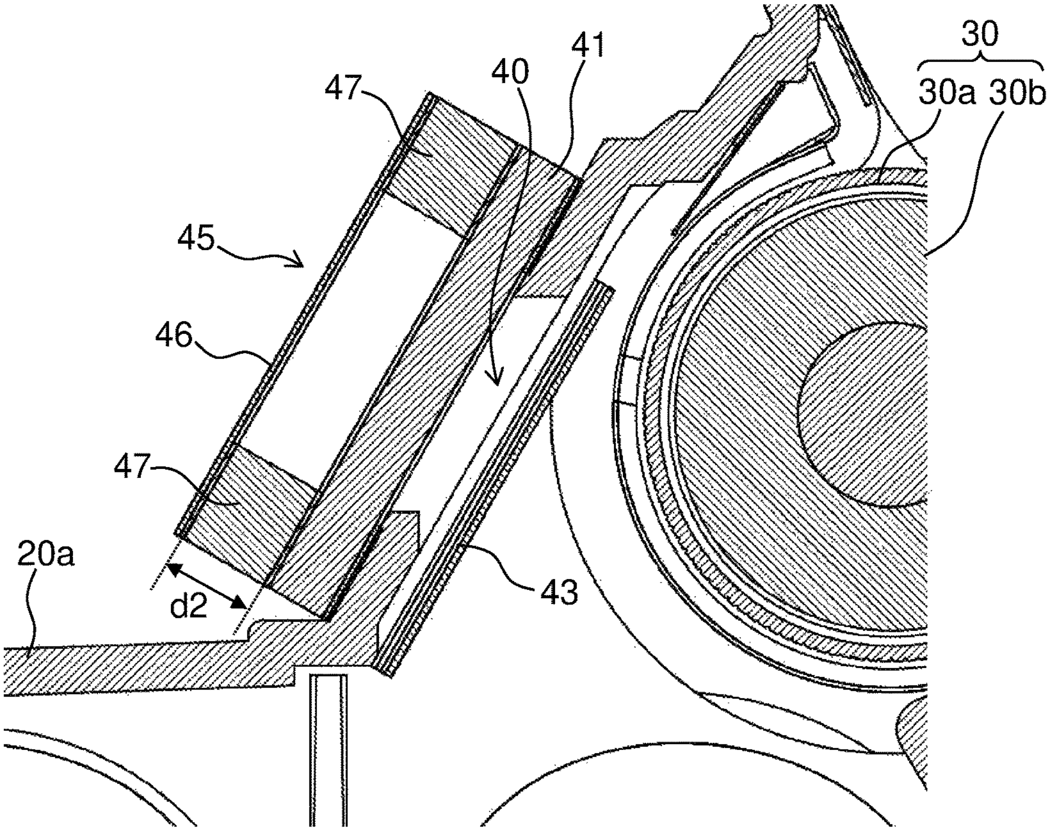
FIG. 7 is an enlarged sectional view around a vent hole in a development device according to a second embodiment of the present disclosure.
Figure 8:
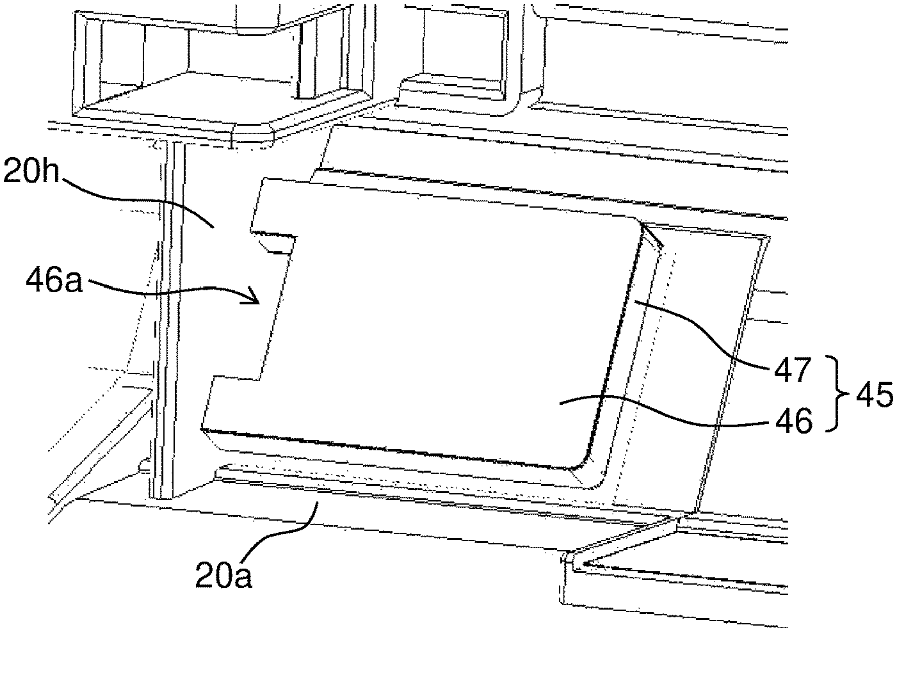
FIG. 8 is a perspective view around the vent hole in the development device according to the second embodiment.

FIG. 7 is an enlarged sectional view around the vent hole 40 in the development device 3*a* according to a second embodiment of the present disclosure. FIG. 8 is a perspective view around the vent hole 40 in the development device 3*a* according to the second embodiment. Note that FIG. 7 shows a cross-section near a fixing portion 43*b* (see FIG. 5) of a developer leakage prevention sheet 43. FIG. 8 shows the construction around the vent hole 40 at one side of the development container 20 in the longitudinal direction (the rear side of the plane of FIG. 7) and the construction at the other side (the front side of the plane of FIG. 7) is similar except that it is symmetrical left to right.

In this embodiment, in addition to a developer leakage prevention sheet 43 similar to that in the first embodiment, a developer leakage prevention member 45 is provided to cover the filter 41 from the outside. The developer leakage prevention member 45 includes a film 46 and a spacer 47.

Figure 9:
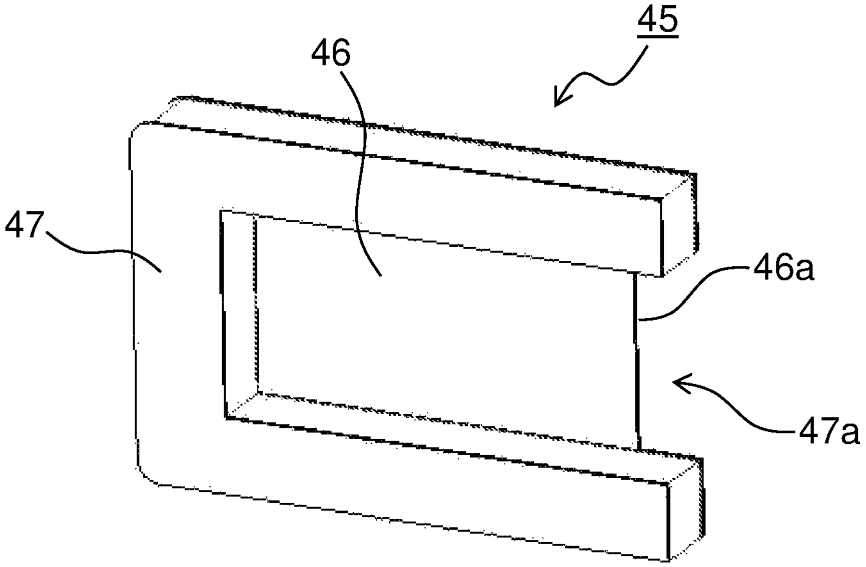
FIG. 9 is a perspective view of a developer leakage prevention member arranged outside the vent hole as viewed from a filter side.

FIG. 9 is a perspective view of the developer leakage prevention member 45 as viewed from the filter 41 side. The film 46 has a rectangular shape and a cutout-like opening 46*a* is formed along one side (the right side in FIG. 9). The spacer 47 is attached, in a U-shape in a plan view, along the outer circumferential edge of the film 46. The film 46 is a polyethylene terephthalate (PET) film like the developer leakage prevention sheet 43. The spacer 47 is made of a sponge material such as urethane foam.

The surface of the spacer 47 opposite the film 46 is fixed to the outer surface of the filter 41, so that the film 46 is arranged opposite the filter 41 with a gap d2 in between. The spacer 47 has a missing portion 47*a* in a part of the outer circumferential edge of the film 46 (one side where the opening 46*a* is formed). When the developer leakage prevention member 45 is attached to the filter 41, the missing portion 47*a* is arranged so as to make contact with a rib 20*h* on the development container 20. The opening 46*a* serves as a communication portion for communication between the inside and outside of the developer leakage prevention member 45. The opening 46*a* is formed at a position that does not overlap the vent hole 40 in a plan view.

With the construction according to this embodiment, the developer leakage prevention member 45 is arranged on the outer surface of the filter 41 to catch leaked developer. Thus, even if a very small amount of developer passes through the filter 41 and leaks out, the leaked developer stays in the gap d2 between the filter 41 and the film 46. It is thus possible to prevent contamination of the exterior surface of the development device 3*a* and the inside of the image forming apparatus 100 resulting from developer leakage. In order to retain the developer, the gap d2 is formed larger (3 mm in this embodiment) than the gap d1.

The gap d2 is formed between the filter 41 and the film 46 by the spacer 47 and the opening 46*a* is formed in the film 46; thus, a ventilation passage from the inside to the outside of the development container 20 can also be secured. Since the vent hole 40 and the opening 46*a* do not overlap in a plan view, the developer that has passed from the vent hole 40 through the filter 41 is less likely to leak out through the opening 46*a* and this makes it easier to retain the developer in the gap d2.

The present disclosure is not limited by the embodiments described above and allows for any modifications made without departure from the spirit of the present disclosure. For example, the shapes, dimensions, arrangement positions, and the like of the vent hole 40, the developer leakage prevention sheet 43, the developer leakage prevention member 45, and the like specifically mentioned in the above embodiments are merely examples and may be changed as appropriate according to the specifications of the development devices 3*a* to 3*d*.

For example, while in the first embodiment the developer leakage prevention sheet 43 is arranged inward of the vent hole 40 with the gap d1 from it in the up-down direction, forming the gap d1 at least at one side of the developer leakage prevention sheet 43 permits a ventilation passage to be secured from inside the development container 20 to the vent hole 40. However, forming the gap d1 only at one place makes it difficult for air to flow from inside the development container 20 to the vent hole 40. To cope with that, it is preferable to form the gap d1 in the up-down direction or in the left-right direction. In order to return the developer that has entered between the developer leakage prevention sheet 43 and the filter 41 into the development container 20 (feeding conveyance chamber 22), it is more preferable to form the gap d1 in the up-down direction of the developer leakage prevention sheet 43.

Figure 10:
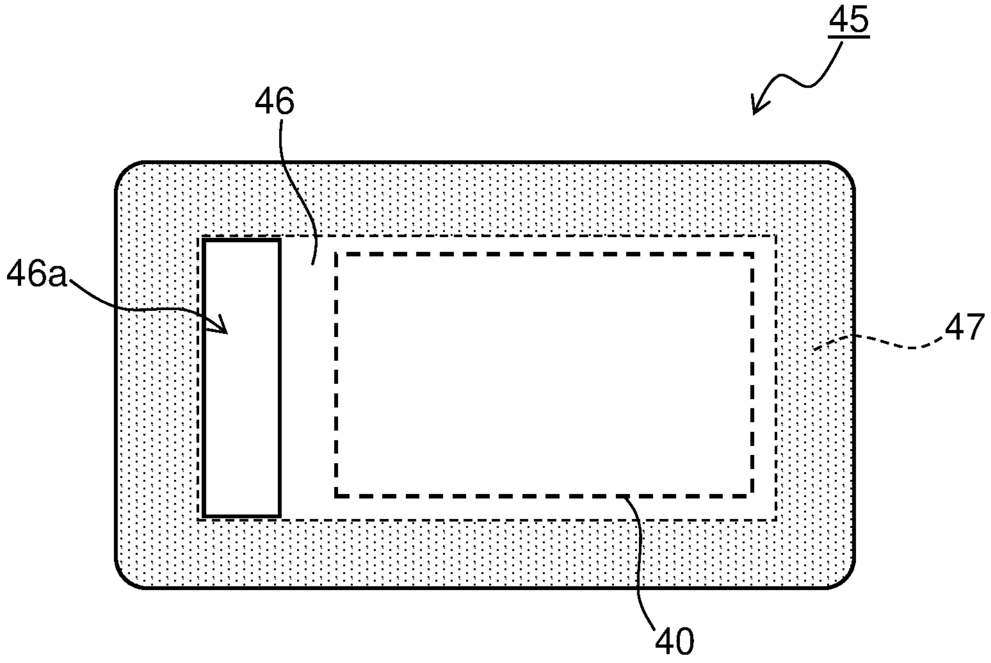
FIG. 10 is a plan view showing a modified example of the developer leakage prevention member.

In the second embodiment, the missing portion 47*a* in the spacer 47, which is U-shaped in plan view, is kept in contact with the rib 20*h*, and the spacer 47 and the rib 20*h* surround, so as to partition, the developer leakage prevention member 45 around its entire circumference. Instead of this construction, as shown in FIG. 10, a ring-shaped spacer 47 with no missing portion 47*a* may be attached to the film 46. In this case, the opening 46*a* in the film 46 is formed at a position that does not overlap the vent hole 40 or the spacer 47 in a plan view.

While the above embodiments deal with examples in which developer is fed from the feeding conveyance screw 26 to the development roller 30, this is not meant to limit the present disclosure. A magnetic roller may be provided between the feeding conveyance screw 26 and the development roller 30 and, after developer is fed from the feeding conveyance screw 26 to the magnetic roller, only toner may be fed from the magnetic roller to the development roller 30.

While the above embodiments deal with two-component development type development devices 3*a* to 3*d* that use two-component developer containing toner and magnetic carrier, the present disclosure is applicable also to development devices employing a magnetic one-component development method that use magnetic one-component developer containing only magnetic toner, and development devices employing a non-magnetic one-component development method that use non-magnetic one-component developer containing only non-magnetic toner.

The present disclosure is applicable not only to tandem color printers like the one shown in FIG. 1 but also to various types of image forming apparatuses provided with a development device, such as digital or analog monochrome copiers, monochrome printers, color copiers, and facsimile machines.

The present disclosure can be used in development devices that store powder developer inside. Based on the present disclosure, it is possible to provide a development device that does not impair an internal pressure reduction function during normal operation and that does not cause leakage of developer due to vibration or fall during transportation, and to provide an image forming apparatus provided with such a development device.

What is claimed is:

1. A development device comprising:

a development container that stores developer containing toner;

a stirring conveyance member that conveys, while stirring, the developer inside the development container;

a developer carrier that is rotatably supported inside the development container and that carries on an outer circumferential surface thereof the developer to feed the toner to an image carrier on which an electrostatic latent image is formed;

a vent hole that is formed in the development container and through which an inside and an outside of the development container communicate with each other; and a filter that is arranged to cover the vent hole from outside the development container, wherein inside the development container, a flexible developer leakage prevention sheet is arranged opposite the vent hole so as to overlap the entire vent hole, a gap is formed between the developer leakage prevention sheet and an opening edge of the vent hole, the developer leakage prevention sheet has a rectangular shape and has a fixing portion formed along two opposite sides, the fixing portion being thicker than another part of the developer leakage prevention sheet, and fixing the fixing portion to the opening edge of the vent hole leaves the gap along other two sides at which the fixing portion is not formed.

2. The development device according to claim 1, wherein the gap is formed along two opposite sides of the developer leakage prevention sheet with respect to an up-down direction in a state where the development device incorporated in the image forming apparatus.

3. The development device according to claim 1, further comprising:

a developer leakage prevention member that covers the filter from outside;

wherein the developer leakage prevention member has:

a film that faces the filter; and a spacer that is attached along an outer circumferential edge of the film, and an opening is formed in a part of the film so that, with the developer leakage prevention member attached to the filter, the inside and outside of the development container communicate with each other via the filer and the opening.

4. The development device according to claim 3, wherein the opening is formed at a position that does not overlap the vent hole in a plan view as viewed from a direction perpendicular to an opening surface of the vent hole.

5. An image forming apparatus comprising:

the development device according to claim 1.

6. A development device comprising:

a development container that stores developer containing toner;

a stirring conveyance member that conveys, while stirring, the developer inside the development container;

a developer carrier that is rotatably supported inside the development container and that carries on an outer circumferential surface thereof the developer to feed the toner to an image carrier on which an electrostatic latent image is formed;

a vent hole that is formed in the development container and through which an inside and an outside of the development container communicate with each other; and a filter that is arranged to cover the vent hole from outside the development container, wherein inside the development container, a flexible developer leakage prevention sheet is arranged opposite the vent hole so as to overlap the entire vent hole, a gap is formed between the developer leakage prevention sheet and an opening edge of the vent hole, the development device further includes a developer leakage prevention member that covers the filter from outside;

the developer leakage prevention member has:

a film that faces the filter; and a spacer that is attached along an outer circumferential edge of the film, an opening is formed in a part of the film so that, with the developer leakage prevention member attached to the filter, the inside and outside of the development container communicate with each other via the filer and the opening, and a gap between the film and the filter is larger than a gap between the developer leakage prevention sheet and the opening edge of the vent hole.

7. A development device comprising:

a development container that stores developer containing toner;

a stirring conveyance member that conveys, while stirring, the developer inside the development container;

a developer carrier that is rotatably supported inside the development container and that carries on an outer circumferential surface thereof the developer to feed the toner to an image carrier on which an electrostatic latent image is formed;

a vent hole that is formed in the development container and through which an inside and an outside of the development container communicate with each other; and a filter that is arranged to cover the vent hole from outside the development container, wherein inside the development container, a flexible developer leakage prevention sheet is arranged opposite the vent hole so as to overlap the entire vent hole, a gap is formed between the developer leakage prevention sheet and an opening edge of the vent hole, and the developer leakage prevention sheet is formed of a sheet made of polyethylene terephthalate.

* * * * *